United States Patent [19]

Falk

[11] Patent Number: 4,968,442
[45] Date of Patent: Nov. 6, 1990

[54] GEL COMPOSITION AND METHOD OF TREATMENT

[75] Inventor: David O. Falk, Denver, Colo.

[73] Assignee: Marathon Oil Company, Findlay, Ohio

[21] Appl. No.: 331,405

[22] Filed: Mar. 30, 1989

[51] Int. Cl.⁵ .............................................. E21B 43/26
[52] U.S. Cl. .............................. 252/8.551; 252/8.553
[58] Field of Search .......................... 252/8.551, 8.553

[56] References Cited

U.S. PATENT DOCUMENTS

| | | | |
|---|---|---|---|
| 3,481,400 | 12/1969 | Kerver et al. | 166/279 |
| 3,898,165 | 8/1975 | Ely et al. | 252/8.551 |
| 3,938,594 | 2/1976 | Rhudy et al. | 166/308 |
| 4,324,668 | 4/1982 | Harris | 252/8.553 |
| 4,428,432 | 1/1984 | Pabley | 166/302 |
| 4,488,601 | 12/1984 | Hammett | 166/270 |
| 4,506,734 | 3/1985 | Nolte | 166/308 |
| 4,552,674 | 11/1985 | Brown et al. | 252/8.55 R |
| 4,604,218 | 8/1986 | Dawson | 252/8.553 |
| 4,624,795 | 11/1986 | Dawson et al. | 252/8.553 |
| 4,636,572 | 1/1987 | Hudson et al. | 556/2 |
| 4,644,073 | 2/1987 | Mumallah et al. | 556/2 |
| 4,722,397 | 2/1988 | Sydansk et al. | 166/295 |
| 4,770,796 | 9/1988 | Jacobs | 252/8.553 |

Primary Examiner—Robert L. Stoll
Assistant Examiner—Chhaya Sayala
Attorney, Agent, or Firm—Jack L. Hummel; Jack E. Ebel

[57] ABSTRACT

A composition for treating a subterranean formation and a method of treatment. An aqueous gel composition is formed by mixing a carboxylate-containing polymer with a crosslinking agent comprised of chromic carboxylate. Ethylenediaminetetraacetic acid is incorporated as a single-component gel breaker. When introduced into a permeable formation, the solution forms a gel which makes the formation impermeable. After a predetermined period of time the gel breaker breaks the gel to a predetermined degree which restores partial or limited permeability to the formation.

4 Claims, 2 Drawing Sheets

GEL COMPOSITION AND METHOD OF TREATMENT

Field of the Invention

This invention relates to a gel and to a method of treating a subterranean formation with the gel so as to alter the permeability of the formation. More particularly, it relates to a gel which has the capability of altering the permeability of the formation a predetermined amount.

Background of the Invention

Oil wells which produce fluids containing an unacceptably high amount of water are often treated by introducing a gel into highly permeable formations to block the flow of the water. This normally results in reducing water production and increasing drawdown of the fluid column. In many cases, however, oil production does not increase, and in fact may even decrease, as a result of the oil now having to flow through the matrix rather than through the more permeable formation of its former path. It would therefore be beneficial to be able to shut off the permeable zone in order to reduce water production and to subsequently open it again at a reduced permeability level so as to increase oil production.

Until now such operations have not been commercially possible because the gels used to close off a formation completely block the fractures in the formation, making the formation impermeable. If it is desired to open the formation after a period of time, known methods of treatment can be carried out to break the gel while in place or the gel can be selected so as to eventually degrade due to the effects of time and temperature. In either case the original permeability of the formation is restored, not a different permeability.

Many different gel systems have been employed in the treatment of subterranean formations, some utilizing various polymeric materials and crosslinking agents. It is also known to include a breaker in the gel composition so that the breaker can degrade the gel after a predetermined period of time instead of having to treat the gel in place. Breakers have included many different materials, including various oxidizing agents, strong chemicals, chelating agents, organic chemicals and chemically associated compositions, and in many cases two or more ingredients are used as breakers in a gel system.

There is, however, no gel-breaker system which functions other than to completely break down the gel after a period of time, making it very difficult to treat highly permeable formations in any different manner than the manner in which it has been treated in the past.

Summary of the Invention

In accordance with one aspect of the invention a liquid composition is provided which comprises a polymeric material comprising a carboxylate-containing polymer. The polymeric material is crosslinked with a chromic carboxylate complex to form a gel, and a breaker consisting essentially of ethylenediaminetetraacetic acid (EDTA) is incorporated in the composition.

It has been found that in a gel system of this nature, when EDTA is used as the sole breaker the gel can be broken to a predetermined limited extent. In other words, the gel-breaker system can be introduced into a permeable formation to shut off flow through the formation, and after a predetermined period of time the breaker will degrade the gel to a point which restores limited permeability to the formation. This is quite different from gels which can only completely shut off flow in a formation and then be broken to completely restore flow.

In addition to treating a formation in connection with efforts to reduce water production in a producing oil well, other uses can be made of the gel-breaker system of the present invention. For example, when drilling a well bore through a zone of relatively high permeability prior to reaching a zone of lower permeability, the gel-breaker system can be introduced to shut off the first zone until drilling is completed. Then when the breaker takes effect the gel is only partially degraded, leaving the zone with a permeability less than its original permeability. In this manner the permeability of the different zones can be made substantially similar for production purposes.

The use of EDTA in a gel system is not unknown. For example, U.S. Pat. No. 4,428,432 discloses the use of EDTA as an additive in a crosslinked acid polymer gel system in order to reduce the tendency for solids to form upon the breaking of the crosslinked acid polymer. The crosslinked acid polymer breaks down as the result of time and temperature, not as a result of the EDTA.

In U.S. Pat. No. 4,644,073 the use of EDTA as a sequestrant is disclosed. It is introduced into the formation being treated as a spacer solution between cycles of introduction of aqueous polymer and chromium propionate. U.S. Pat. No. 4,636,572 teaches a similar use.

In U.S. Pat. No. 4,488,601 EDTA is also disclosed as providing the function of a sequestering anion in a spacer between the cycles of introduction of polymer and crosslinking agent. In addition, it is disclosed as being used as a retarding anion in the preparation of crosslinking agents.

The use of EDTA as a single component breaker in a gel system of the type described, however, is not suggested in the prior art.

Description of the Preferred Embodiment

Figure 1:
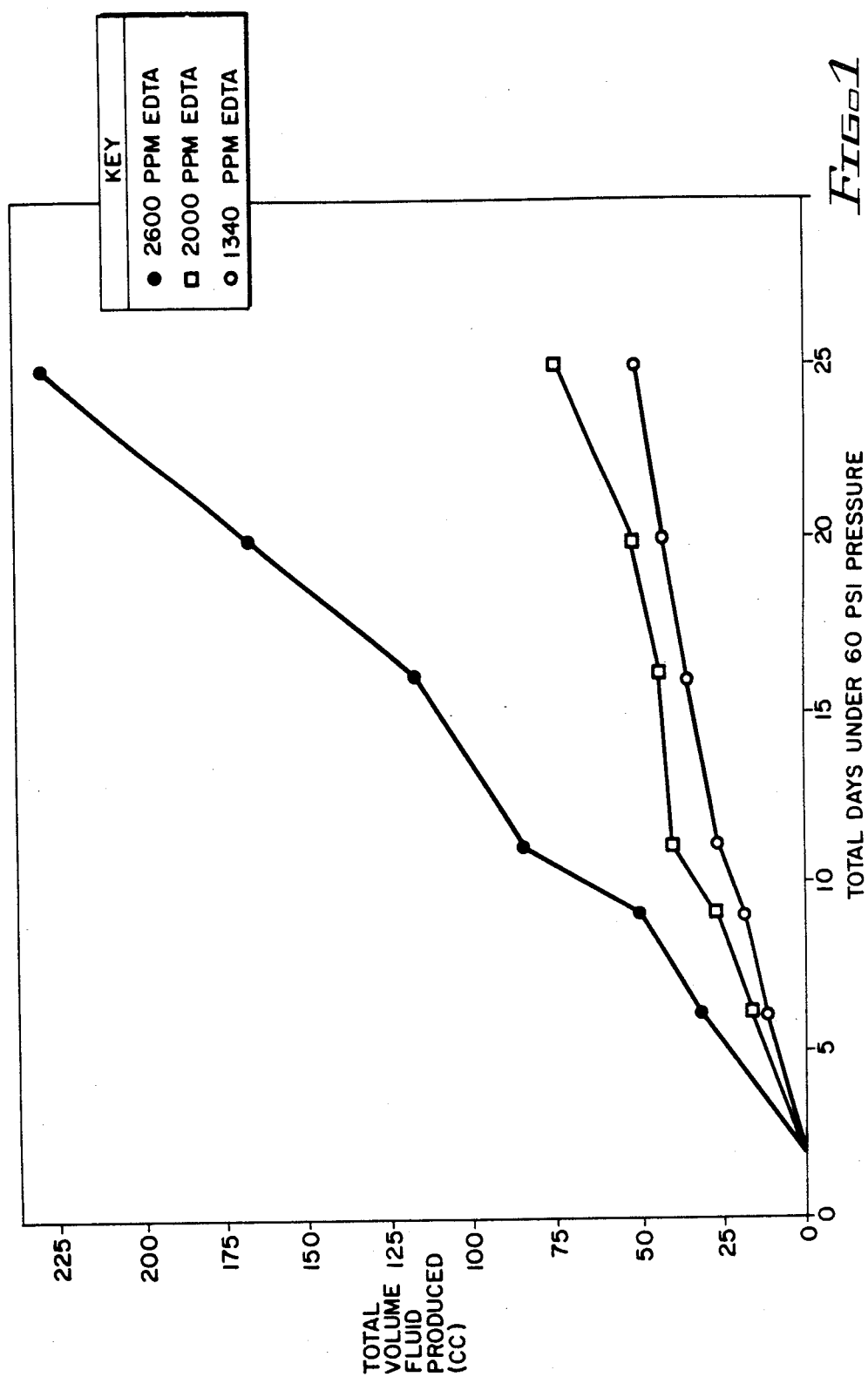
FIG. 1 is a graph illustrating the partial degradation of the gel caused by the use of EDTA as a single component breaker.

In carrying out the invention, an aqueous gelation solution is formed by mixing a carboxylate-containing polymer, a chromic carboxylate complex crosslinking agent and EDTA in a suitable solvent such as water or brine. As is well known in the art the polymer and crosslinking agent may be mixed in water to produce a liquid of syrupy consistency which can readily be pumped and injected into a formation of interest. Depending on the amounts of the ingredients used the solution will rapidly form a rigid gel which will last indefinitely unless broken.

The carboxylate-containing polymer may be any crosslinkable, high molecular weight, water soluble, synthetic polymer or biopolymer containing one or more carboxylate species. The average molecular weight of the carboxylate-containing polymer is in the range of about 10,000 to about 50,000,000, with the preferred range being about 100,000 to about 20,000,000.

The biopolymers useful in the invention include polysaccharides and modified polysaccharides. Exemplary biopolymers are guar gum and carboxymethylcellulose. Examplary synthetic polymers include acrylamide polymers, such as polyacrylamide, partially hydrolyzed polyacrylamide and terpolymers containing acrylamide, acrylate and a third species. As defined herein, polyacrylamide (PA) is an acrylamide polymer having substantially less than 1% of the acrylamide groups in the form of carboxylate groups. Partially hydrolyzed polyacrylamide (PHPA) is an acrylamide polymer having at least 1%, but not 100%, of the acrylamide groups in the form of carboxylate groups. The acrylamide polymer may be prepared according to any of the well known conventional methods in the art. The preferred carboxylate-containing polymer is polyacrylamide or partially hydrolyzed polyacrylamide.

The crosslinking agent is a chromic carboxylate complex, the term "complex" being defined as an ion or molecule containing two or more interassociated ionic, radical or molecular species. A complex ion as a whole has a distinct electrical charge while a complex molecule is electrically neutral. The term "chromic carboxylate complex" encompasses a single complex, mixtures of complexes containing the same carboxylate species, and mixtures of complexes containing differing carboxylate species.

The complex of the present invention includes at least one or more electropositive chromium III species and one or more electronegative carboxylate species. Each complex optionally contains additional species which are not essential to the polymer crosslinking function of the complex, such as one or more water molecules or inorganic monovalent or divalent ions which function merely to balance the electrical charge of the complex.

Trivalent chromium and chromic ion are equivalent terms encompased by the term "chromium III species" as used herein. The carboxylate species are advantageously derived from water soluble salts of carboxylic acids, especially low molecular weight mono-basic acids. Carboxylate species derived from salts of formic, acetic, propionic and lactic acid, lower substituted derivatives thereof and mixtures thereof are preferred. The carboxylate species include formate, acetate, propianate, lactate, lower substituted derivatives thereof and mixtures thereof, all of which are water soluble. The optional inorganic ions include sodium, sulfate, nitrate and chloride ions.

The complexes described and their method of preparation are well known in the art. The preferred chromic carboxylate complex for use in this invention is chromic acetate complex.

Gels having a predetermined gelation rate and resultant gel properties can readily be produced in accordance with the invention by those skilled in the art. Once such gels are in place, however, they are extremely difficult to displace other than by total destruction of the crosslinked network, such as by incorporating a breaker in the gel.

By incorporating a known breaker system in the gel solution the rigid gel can be expected to form in a matter of hours and to break down over varying periods of time. In general, referring by way of example to the preferred polymer and crosslinking agent, a 2% solution of polyacrylamide mixed in a 20:1 ratio with a 10% solution of chromic triacetate forms a rigid gel in the presence of various types of breakers in from 4 hours to one day at 185° F. For example, using 10% breaker solutions in amounts approximately half the amount of chromic triacetate, with sodium sulfite as a breaker the solution gels in 6 hours and breaks in about 3 days, with ammonium persulfate as the breaker the solution gels in 4 hours and breaks in 2-8 days, with sodium chlorate the solution gels in 6 hours to one day and breaks in 3-17 days, with sodium nitrite the solution gels in 6 hours and breaks in 6-10 days, and with methylacetoacetate the solution gels in from several hours to one day and breaks in 6 days. In all cases of these and other breakers commonly known but not listed herein, the gel completely reverts to liquid form after breaking. In other words the breaking of the gel is complete, not partial.

Despite the common usage of various types of breakers in a carboxylate-containing gel system, the use of EDTA as a single component breaker has not heretofore been employed. In a test made to illustrate the performance of EDTA as a breaker in such a gel system, a 5000 ppm aqueous solution of polyacrylamide was mixed a 25% solution of chromic triacetate in a ratio of 20:1 and shaken for a period of 15-25 seconds. A solution of EDTA ranging from 1340 ppm to 2660 ppm was then added and shaken for another period of 15-25 seconds. The total volume of the aqueous solution after all ingredients had been added was 200 ml.

After mixing, the solution was poured into a glass beadpack formed by packing spheres of glass ranging in size from fine particles to pearl size in a Plexiglas cylinder. The pore space created by the packed beads, which simulates the large fractures encountered in a formation, receives the solution. After the solution gelled into a rigid gel the upper surface of the beadpack was exposed to water at a constant pressure of 60 psi and the beadpack was monitored to determine how long it took before water appeared at the bottom of the beadpack and in what quantities. This would indicate both the period of time required for the gel to break and the degree of degradation.

The results of the tests are illustrated in the graph of FIG. 1 which is a plot of the total number of days the beadpack was under pressure versus the total volume of fluid produced through the beadpack. Degradation of the gel began for all three gel systems at some point between 3 and 6 days, but the amount of water flowing through the beadpack varied with the concentration of EDTA in the gel. Thus the gel containing 1340 ppm of EDTA permitted 52.5 cc of fluid flow through the beadpack over a period of 25 days, the gel containing 2000 ppm of EDTA permitted 74.5 cc and the gel containing 2660 ppm of EDTA permitted 229.0 cc. In all cases the flow was substantially constant after 11 days of exposure to the pressurized water.

This means that, based on the initial strength of the gel and the concentration of EDTA, a predictable partial permeability recovery of a formation treated with the gel of the present invention is possible. Although the mechanism involved in the partial degradation of the gel is not definitely known, it appears that the EDTA sequestered a certain amount of the chromium ions ($Cr^{+3}$) away from the polyacrylamide, including excess ions in solution, then did not affect the balance of the crosslinked polyacrylamide.

It can be seen that a gel formed in accordance with the invention can be used to treat a permeable formation so that after a predetermined period of time the gel will partially degrade, leaving the formation with a lesser degree of permeability than it originally had. In addition to the use suggested earlier, that of treating a formation in order to reduce water production, the invention can be used in other ways.

Figure 2:
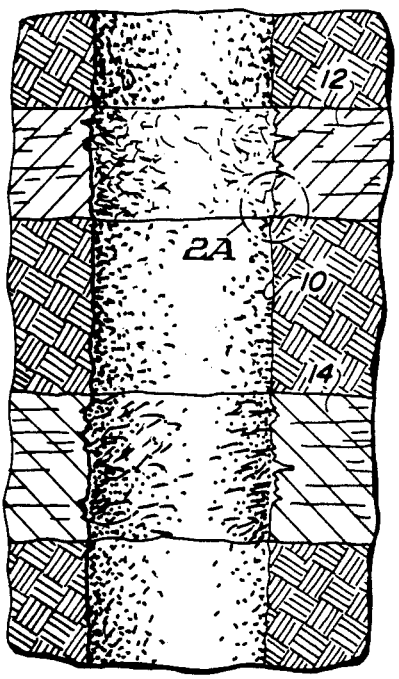
FIG. 2 is a schematic cross-sectional view of a well bore penetrating two different formations.
Figure 2A:
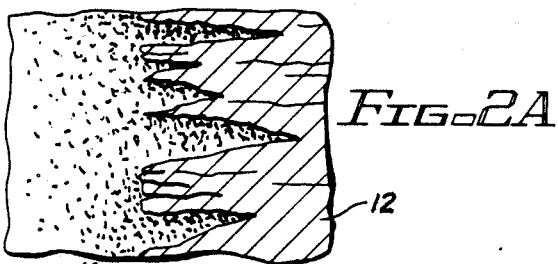
FIG. 2A is an enlarged view of the upper portion of the broken circle in FIG. 2, showing in simplified pictorial form the permeable nature of the first formation penetrated by the well bore.

Referring to FIG. 2, a well bore 10 can be seen to penetrate two different formations 12 and 14, the formation 12 being more permeable than the formation 14. The highly permeable nature of the formation 12 is depicted for purpose of illustration in FIG. 2A by the various fissures extending into the formation from the well bore.

Figure 3:
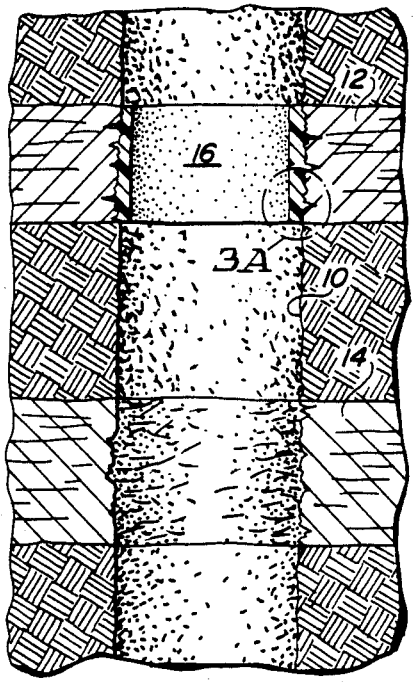
FIG. 3 is a view similar to that of FIG. 2, but showing the well bore after the first formation has been treated.
Figure 3A:
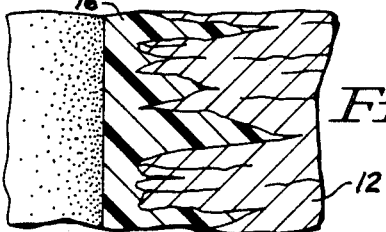
FIG. 3A is an enlarged view similar to that of FIG. 2A, but showing the first formation after it has been treated.

As schematically shown in FIG. 3, a liquid composition containing polymer, crosslinking agent and EDTA in accordance with the present invention is injected into the formation 12 where it gels to form a rigid gel 16 which in time partially degrades. The gel prior to degradation is shown in FIG. 3A as filling the fissures of FIG. 2A.

Figure 4:
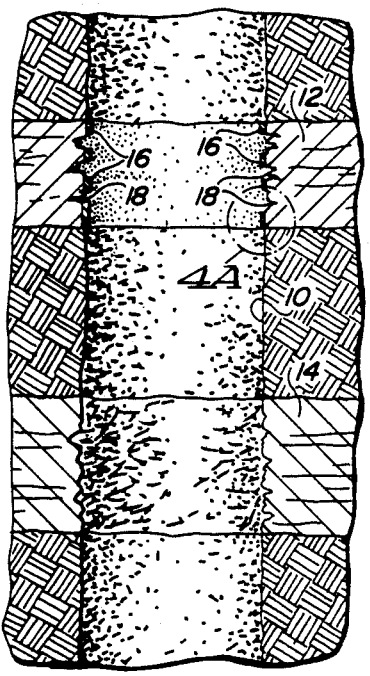
FIG. 4 is a view similar to that of FIG. 3, but showing the well bore after the gel introduced into the first formation has partially degraded.
Figure 4A:
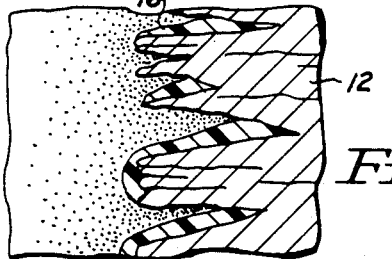
FIG. 4A is a view similar to that of FIG. 3A, but showing the first formation after the gel has partially degraded.

The result of the partial degradation is schematically shown in FIG. 4 wherein the intervals or gaps 18 between segments of gel 16 indicate the partially restored permeability of the formation 12. This is further shown in FIG. 4A for purpose of illustration by the presence of gel on only some of the surfaces of the fissures in the formation 12. Thus by controlling the formulation of the gel-breaker system the permeability of the formation 12 can be altered, for the purpose of more efficient oil production, so as to be substantially similar to that of the formation 14.

The treatment of a formation to change its permeability need not be limited to the situation illustrated wherein there are only two formations under consideration. If more than two formations having different permeabilities exist and it is desired to alter the permeability of more than one formation, the different formations involved can readily be treated by gel compositions formulated according to the degree of permeability desired after partial degradation of the gel occurs.

It should now be appreciated that the gel-breaker system of the invention provides the unique function of reducing the permeability of a formation by a controlled amount through the addition of a liquid composition which initially gels to form a rigid gel, then partially degrades to allow partial restoration of the permeability. Although certain specific uses of the invention have been suggested, others will suggest themselves to those skilled in the art.

It should now be understood that the invention is not necessarily limited to all the specific details described in connection with the preferred embodiment, but that changes to certain features of the preferred embodiment which do not affect the overall basic function and concept of the invention may be made by those skilled in the art without departing from the spirit and scope of the invention, as defined in the appended claims.

What is claimed is:

1. A gel composition suitable for treating a subterranean formation consisting essentially of:
   a polymeric material crosslinked with an agent comprising a chromic carboxylate complex; and
   a gel breaker consisting of ethylenediaminetetraacetic acid in an amount capable of breaking the gel to a predetermined degree after a predetermined period of time.

2. A gel composition according to claim 1, wherein the polymeric material is a carboxylate-containing polymer.

3. A gel composition according to claim 1, wherein the polymeric material is an acrylamide polymer and the crosslinking agent comprises a chromic acetate complex.

4. A gel composition according to claim 3, wherein the polymer is a synthetic polymer selected from the group consisting of polyacrylamide and partially hydrolyzed polyacrylamide and the crosslinking agent comprises a chromic acetate complex.

* * * * *

UNITED STATES PATENT AND TRADEMARK OFFICE
CERTIFICATE OF CORRECTION

PATENT NO. : 4,968,442

DATED : November 6, 1990

INVENTOR(S) : David O. Falk

It is certified that error appears in the above-identified patent and that said Letters Patent is hereby corrected as shown below:

Col. 3, line 19: Delete "Examplary" and insert therefor --Exemplary--.
Col. 3, line 61: Delete "propianate" and insert therefor --propionate--.
Col. 6, line 29: After "material" insert --selected from a biopolymer or a synthetic polymer--.

Signed and Sealed this

Thirty-first Day of March, 1992

Attest:

HARRY F. MANBECK, JR.

*Attesting Officer*  *Commissioner of Patents and Trademarks*